Patented June 26, 1945

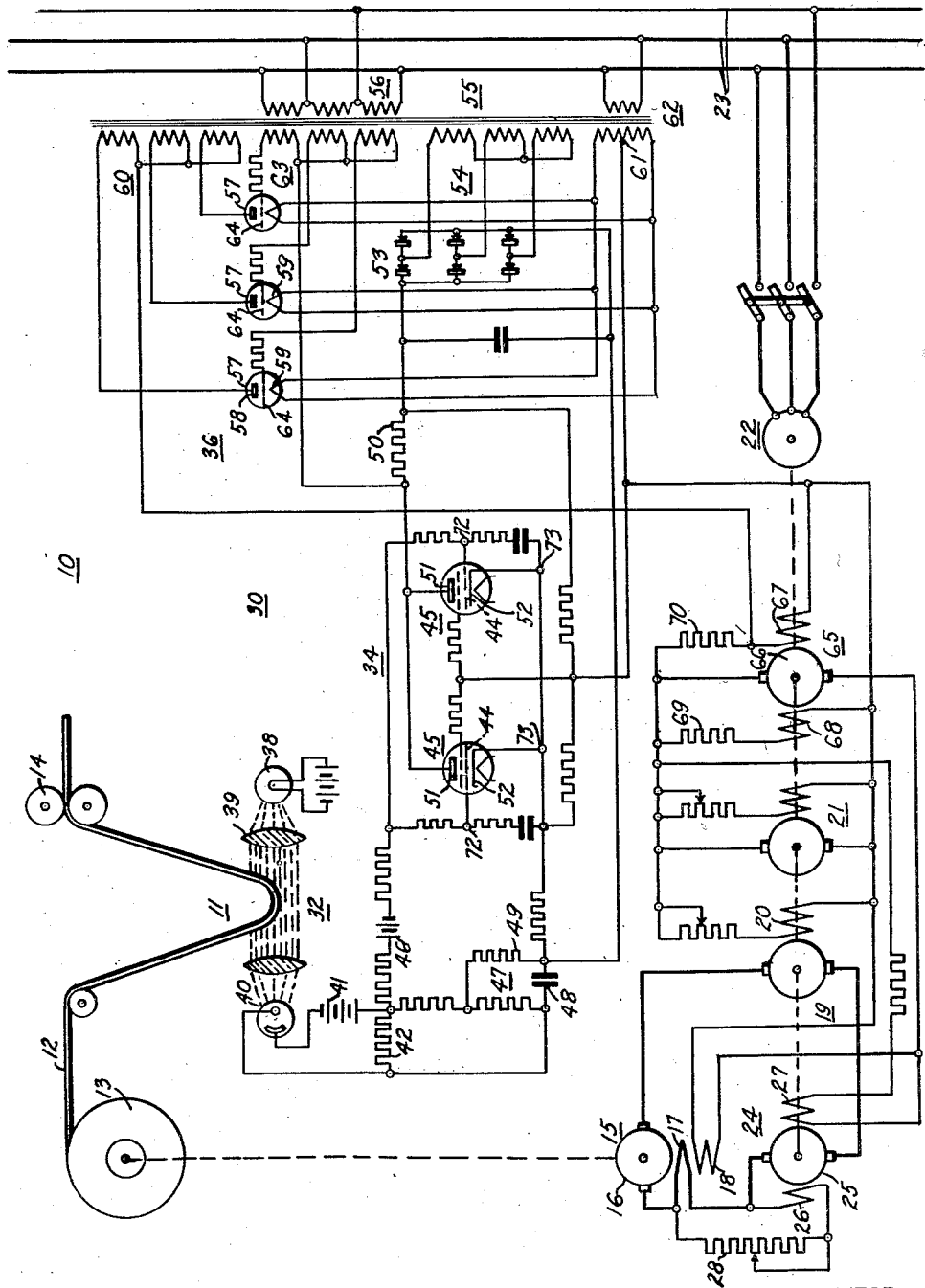

2,379,132

UNITED STATES PATENT OFFICE 2,379,132

CONTROL SYSTEM

Willard G. Cook, Wilkinsburg, Pa., assignor to Westinghouse Electric Corporation, East Pittsburgh, Pa., a corporation of Pennsylvania Application July 28, 1943, Serial No. 496,406

9 Claims. (Cl. 172—239)

My invention relates, generally, to control systems, and it has reference in particular to control systems for regulating the amount of looped material extending between two work devices or elements of strip mill or the like.

Generally stated, it is an object of my invention to provide an improved loop regulator system that is simple and inexpensive to manufacture and is easy to operate.

More specifically, it is an object of my invention to provide for increasing the effective operating range of sensitive electronic voltage regulators by using a differential exciter which operates under the control of the regulator.

It is also an object of my invention to provide a sensitive wide range control system by utilizing an electronic control device having a relatively narrow stable operating range for controlling the energization of one of the opposing field windings of a differential exciter.

Another object of the invention is to provide for controlling the length of the loop between two machines in a strip mill or the like by controlling the speed of one of the machines by means of a differential exciter having a field winding energized under the control of a photoelectronic regulator which is responsive to the length of the loop.

Another object of my invention is to provide for utilizing a sensitive high speed electronic regulator having a stable operating voltage range on the order of 45 to 180 volts in connection with a differential exciter which is arranged for bucking or boosting a substantially constant voltage source for producing a relatively wide range of output voltages ranging from at least 50 to 500 volts.

Yet another object of my invention is to provide for producing a control voltage having a ratio of 10:1 or greater in response to variations produced by a sensitive high speed electronic control device having a stable operating voltage range on the order of 4:1 by using the electronic control device to control the output of a differential exciter.

Other objects will in part be obvious, and will in part appear hereinafter.

In practicing my invention the loop between a reel motor and a trimmer motor in a strip mill, for example, is regulated by having the loop intercept a beam or a series of beams of light in a photoelectric system. An electronic amplifier having a relatively stable operating range of between approximately 45 to 180 volts or a ratio of about 4:1, is used to control the energization of the main field winding of a differential exciter which is so connected in series circuit relation with the main field winding of the reel motor and a substantially constant voltage source as to vary the voltage applied to the field winding over a range of from at least 50 to 500 volts, thus giving a stable operating range with a ratio of about 10:1.

For a more complete understanding of the nature and scope of my invention reference may be made to the following detailed description, which may be read in connection with the accompanying drawing in which the single figure is a diagrammatic view of a loop control system embodying the principal features of the invention.

Referring to the single figure of the drawing, the reference numeral 10 may denote, generally, a loop regulator system for controlling the length of a loop 11 in a strip 12 between a reel 13 and a pair of trimmer rolls 14 in a strip mill or the like, where a strip of material is to be processed in one manner or another.

In this instance the trimmer rolls 14 may be driven by means of a suitable motor (not shown) at a substantially constant speed. The reel 13 may be driven by a reel motor 15 having an armature 16 with series and main field windings 17 and 18, respectively. The length of the loop 11 may, therefore, be varied by controlling the speed of the reel motor 15, the armature 16 of which may be energized from a suitable source such as the main generator 19, which may be provided with a field winding 20 energized from a constant voltage source such as the generator 21. A booster generator 24 having an armature 25 and main and differential field windings may be provided for controlling the voltage applied to the armature 16 of the reel motor 15. These generators may be driven by a motor 22 connected to an alternating current source by conductors 23.

The armature 25 of the booster generator may be connected in series circuit relation with the generator 19 and the armature 16 of the reel motor 15, while the main field winding 26 may be energized by the voltage drop across the series field winding 17 of the reel motor through a rheostat 28. The voltage of the booster generator may be varied by varying the excitation of the differential field winding 27.

To control the operation of the reel motor 15 in response to variations in the length of the loop 11, an electronic regulator system 30 of any suitable type may be provided comprising, for example, a photoelectric system 32 for producing a control voltage responsive to movements of the loop, an amplifying system 34, and power controlling valve means 36 controlled thereby for producing sufficient power to control the operation of the reel motor.

The photoelectric control system 32 may, for example, comprise a light source 38 with an associated optical system 39 for projecting a beam or plurality of beams of light on a photoelectric device 40, which beam or beams are disposed to be intercepted by the loop 11 in varying amounts as the length of the loop changes. Means such as a battery 41 and a control resistor 42 may be provided in connection with the photoelectric device 40 for producing a control voltage which varies substantially inversely as the length of the loop 11. This control voltage may be amplified by applying it to the control grids 44 of a pair of control valves 45 in the amplifier system 34 to oppose a negative bias voltage applied thereto by a battery 46 and thus render the control valves more or less conductive as the control voltage increases or decreases.

Means such as the quick response circuit 47 comprising a capacitor 48 and resistor 49 may be provided for controlling the rate of response of the control valves 45, depending upon the rate of change of the control voltage across the control resistor 42 in a manner well known in the art. The control valves 45 may be arranged to vary the voltage drop across a control resistor 50 which may be connected in series circuit relation with the anodes 51 and cathodes 52 of the control valves 45 across a source of direct current voltage such as, for example, the rectifier circuit 53 and the star connected secondary circuit 54 of a control transformer 55, the primary winding 56 of which may be connected to a three phase alternating current source by the conductors 23.

The voltage produced across the control resistor 50 may be used to control the conductivity of a plurality of electric valves 57 provided with anodes 58 and cathodes 59 which may be connected between a star connected secondary circuit 60 of the control transformer 55 and the center tap 61 of a filament or cathode transformer 62. Control of the valves 57 may readily be effected by connecting the resistor 50 between the star connected grid transformer circuit 63 to which the control grids 64 of the valves 57 are connected, and the cathode circuit of the valves at the center tap 61, so that the conductivity of the valves is varied substantially directly with the length of the loop 11.

Instead of using the regulator to control the energization of the main field winding 18 of the reel motor 15 directly, throughout only a relatively narrow stable operating voltage range of from about 45 to 180 volts or a ratio of about 4:1, I prefer to control the energization of the main field winding 18 by means of a differential exciter 65 under the control of the regulator system 30. The differential exciter may be provided with an armature 66 and main and differential field windings 67 and 68. The differential field winding 68 may be connected to the constant voltage source 21 in series circuit relation with a suitable field rheostat 69 for producing a voltage across the armature 66 substantially equal to and opposing the voltage of the source 21. The main field winding 67 of the differential exciter may be connected to the constant voltage source 21 through a field resistor 70 for supplying a minimum excitation to the field winding sufficient to prevent the differential field winding 68 from completely overcoming the voltage of the source 21. The principal excitation of the main field winding 67 may be provided by the valve means 57 in response to variations of voltage produced by the photoelectric control system in accordance with the size or position of the loop 11.

When the length of the loop 11 increases under operating conditions, the amount of light received by the photoelectric device 40 is reduced, so that the current flowing through the device is likewise reduced and the voltage across the resistor 42 decreases. The voltage applied to the control grids 44 of the control valves 45 between the points 72 and 73, therefore, becomes more negative since the negative bias voltage produced by the battery 46 remains substantially constant. The conductivity of the control valves 45 is thereby reduced so that the current through, and the voltage across the control resistor 50 is likewise reduced. Since the control resistor 50 is connected in the grid circuit of the valves 57 between the grids 64 and the cathodes 59 in such a direction as to produce a negative bias voltage in the grid circuit, a reduction in the voltage across the resistor 50 increases the conductivity of the valves 57. The energization of the main field winding 67 of the differential exciter 65 is thereby increased. The voltage across the armature of the differential exciter 65 increases accordingly, so that the energization of the main field winding 18 of the reel motor 15 is increased, as is also the energization of the differential field winding 27 of the booster generator 24. The increase in voltage applied to the field winding of the reel motor 15 reduces the speed of the reel motor so that the length of the loop 11 decreases, thus correcting the condition of excessive loop length which existed previously.

At the same time that the voltage applied to the field winding of the reel motor 15 is increased to slow the motor down, the voltage applied to the armature 16 of the reel motor is decreased by reason of the increased energization of the differential field winding 27 of the booster generator 24. This likewise tends to decrease the speed of the reel motor to correct the condition of excessive loop length. Extremely stable operation of the reel motor is thus secured.

When the length of the loop decreases from the desired value, more current passes through the photoelectric device 40, and the conductivity of the control valves 45 is increased. The voltage across the control resistor 50 increases, so that the conductivity of the valves 57 decreases. Accordingly, the energization of the main field winding 67 of the differential exciter 65 decreases so that the differential field winding 68 tends to control the exciter voltage, reducing it sufficiently to cause the reel motor 15 to speed up. The minimum excitation of the main field winding 67 from the constant voltage source 21 prevents the voltage produced by the differential exciter 65 from completely neutralizing the voltage of the source 21, which would result in a zero field on the reel motor 15.

From the above description and the accompanying drawing, it will be apparent that I have provided in simple and inexpensive manner for providing not only a sensitive and high speed loop regulating system by reason of the electronic control portion of the system, but have also provided for an exceedingly wide range of voltage control by reason of using a differential exciter in combination with the photoelectric control device. Whereas photoelectric control devices have a stable operating range of a relatively narrow range of voltages such as, for example, from about 45 to 180 volts (a range of approximately 4:1), I am able to provide a suitable voltage operating range of from at least 50 to 500 volts, for example, (a range of 10:1, and have even attained a range of from 20:1) by using a differential exciter to control the energization of the reel motor field winding by bucking or boosting the voltage from a substantially constant source. In one application, where the differential exciter was arranged for field excitation from the electronic regulator ranging from .2 to .7 ampere, the armature voltage of the exciter ranged from —300 to +277 volts. For practical reasons a range of from —200 to +200 volts was used, which used in the manner hereinbefore described with a 250 volt direct current source such as is commonly used in strip mill applications, gave an operating range of from 50 to 500 volts for the main field winding of the reel motor. Control of the field excitation of the reel motor, and control of the armature voltage as hereinbefore described may be used either independently or together for controlling the length of the loop. Other applications of my control system may also be effected since my invention is not limited to the control of reel motors or of any particular motor in a strip mill or the like. Applications have been made to other types of dynamo-electric machines, such as, for example, dynamometers, what it is desired to control the operation of a dynamometer over a wide range of operating conditions requiring a range of voltages greatly in excess of those which may be secured under suitable operating conditions from a sensitive high speed electronic regulator device.

Since certain changes may be made in the above description and different embodiments of the invention may be made without departing from the spirit thereof, it is intended that all the matter contained in the above description or shown in the accompanying drawing shall be considered as illustrative and not in a limiting sense.

I claim as my invention:

1. A control system comprising, a sensitive electronic regulator having a stable operating voltage range on the order of 4:1, an exciter having an armature connected to boost or buck a substantially constant voltage source and opposing main and auxiliary field windings, circuit means connecting the main field winding for energization under the control of the regulator, and circuit means connecting the auxiliary field winding for energization in the opposite sense from a substantially constant voltage source.

2. A control system for a dynamo-electric machine having an armature and at least one field winding comprising, a sensitive voltage regulator having a relatively narrow stable operating voltage range, an exciter having an armature connected in series circuit relation with the field winding of the dynamo-electric machine across a substantially constant voltage source and main and auxiliary field windings, circuit means connecting one of the field windings to the substantially constant voltage source for producing a voltage across the armature in one direction, and circuit means connecting the other of the field windings for energization from the voltage regulator to produce a voltage across the armature in the opposite direction.

3. A control system for a motor having an armature and at least one field winding comprising, circuit means connecting the armature to a source of electrical energy, an exciter having an armature connected in series circuit relation with the motor field winding across a substantially constant voltage source and opposing main and differential field windings, circuit means connecting the differential field winding to a substantially constant voltage source for producing a voltage across the exciter armature opposing the source, an electronic regulator device producing a control voltage variable over a relatively narrow operating range in response to an operating conditon controlled by the motor, and circuit means connecting the main field winding for energization from the source and from the regulator for producing a voltage across the armature in the same direction as the source, whereby the voltages applied to the motor field are extended over a relatively wide range.

4. A control system for a motor having an armature and a field winding comprising, a differential exciter having an armature connected in series circuit relation with the motor field winding across a source of electrical energy and main and differential field windings, circuit means including a field rheostat connecting the differential field winding to a substantially constant voltage source to produce a voltage across the exciter armature opposing the source so as to produce a minimum voltage on the motor field, circuit means including a resistor connecting the main field winding to the source for producing a minimum voltage across the armature in the same direction as the source voltage, a sensitive electronic regulator responsive to a speed condition of the motor to apply a control voltage having a relatively narrow range of about 4:1 to the main field winding in the same sense as the source so as to produce a maximum voltage on the motor field of at least 10 times the minimum voltage, and a booster generator having an armature connected in series circuit relation with the motor armature across a substantially constant voltage source and a field winding connected across the exciter armature to vary the motor armature voltage in the opposite direction to variations in the motor field voltage.

5. A control system for producing a motor control voltage having a variation on the order of at least 10:1 comprising, a sensitive electronic voltage regulator operable to produce under stable operating condition a variable control voltage of from at least 45 to 180 volts, an exciter having an armature with a main field winding energized from the electronic voltage regulator and a differential auxiliary field winding, circuit means connecting the armature to a substantially constant voltage source so that the voltage produced by the main field winding is additive relative thereto, additional circuit means connecting the differential field winding to the source for producing a voltage across the armature substantially equal to and opposing the source voltage, and circuit means connecting the main field winding to the source for minimum energization in the direction to produce a voltage across the armature sufficient to prevent the net voltage from becoming zero.

6. A control system for a reel motor having an armature and a field winding comprising, an electronic regulator having a stable operating voltage range on the order of 4:1, a differential exciter having main and differential field windings, circuit means connecting the main field winding for energization in one sense under the control of the regulator, additional circuit means connecting the differential field winding for energization in the opposite sense, a booster generator having an armature connected in series circuit relation with the reel motor armature and provided with a main field winding and an auxiliary differential field winding, and circuit means so connecting the armature of the differential exciter in series circuit relation with the source and the reel motor field winding and in shunt relation with the differential field winding of the booster generator that the reel motor armature voltage is reduced whenever the voltage applied to the reel motor field winding is increased and vice versa.

7. For use in a control system for a variable speed strip driving motor having an armature and a field winding, an electronic regulator responsive to a variable control voltage and having a stable operating voltage range on the order of 4:1, an exciter connected for applying a bucking or boosting voltage to the variable speed motor field in conjunction with a substantially constant voltage source and having main and differential field windings, circuit means connecting the differential field winding of the exciter to a source of substantially constant voltage for producing a voltage across the exciter armature subtractive from and substantially equal to the source voltage, and circuit means connecting the electronic amplifier for energizing the main exciter field winding to produce a variable control voltage across the exciter armature additive with respect to and having a maximum value substantially equal to the source voltage, whereby the voltage across the variable motor field varies over a range on the order of 10:1.

8. A control system for use with a motor having an armature and a field winding comprising, an electronic regulator responsive to and operating condition affected by the motor for producing an amplified control voltage variable over a relatively narrow stable operating range on the order of 4:1, a booster generator having an armature connected in series relation with the motor armature and a source of substantially constant voltage, said booster generator having a main field winding for producing a voltage across the booster armature additive to the source and a differential field winding, and an exciter having an armature connected across the booster differential field winding and a differential field winding energized from a substantially constant source to produce a voltage across the booster differential field winding opposing the source voltage and a main field winding energized by the electronic amplifier for producing a voltage across the armature additive with the source voltage.

9. A control system for controlling the operation of a reel motor in a strip mill having an armature and a field winding comprising, an electronic regulator for producing a control voltage variable over a relatively narrow voltage range having a maximum ratio on the order of 4:1, a booster generator having an armature connected for varying the voltage applied to the reel motor armature and provided with a main field winding energized to produce a voltage across the armature additive with respect to the source voltage and an auxiliary field winding, and means for energizing the auxiliary field winding and the reel motor field winding including a differential exciter having an armature connected across the auxiliary field winding and for varying the energization of the reel motor field winding, said exciter having a main field winding energized from said amplifier and an opposing auxiliary winding energized from a substantially constant voltage source for producing a voltage across the exciter armature to simultaneously vary the voltages applied to the reel motor armature and field windings.

WILLARD G. COOK.